United States Patent
Shin (10) Patent No.: US 9,817,759 B2
(45) Date of Patent: Nov. 14, 2017

(54) MULTI-CORE CPU SYSTEM FOR ADJUSTING L2 CACHE CHARACTER, METHOD THEREOF, AND DEVICES HAVING THE SAME

(71) Applicant: SAMSUNG ELECTRONICS CO., LTD., Suwon-si, Gyeonggi-Do (KR)

(72) Inventor: Young Min Shin, Hwaseong-si (KR)

(73) Assignee: SAMSUNG ELECTRONICS CO., LTD., Suwon-si, Gyeonggi-Do (KR)

( * ) Notice: Subject to any disclaimer, the term of this patent is extended or adjusted under 35 U.S.C. 154(b) by 145 days.

(21) Appl. No.: 14/340,215

(22) Filed: Jul. 24, 2014

(65) Prior Publication Data

US 2015/0161047 A1 Jun. 11, 2015

(30) Foreign Application Priority Data

Dec. 10, 2013 (KR) .................. 10-2013-0152783

(51) Int. Cl.
G06F 12/08 (2016.01)
G06F 12/0811 (2016.01)
G06F 12/084 (2016.01)

(52) U.S. Cl.
CPC ........ G06F 12/0811 (2013.01); G06F 12/084 (2013.01); *G06F 2212/1024* (2013.01); *G06F 2212/601* (2013.01); *G06F 2212/6042* (2013.01)

(58) Field of Classification Search
CPC .......... G06F 1/3203; G06F 2212/1028; G06F 12/084; G06F 1/3287; G06F 1/3293; G06F 2212/601; G06F 2212/1024; G06F 12/0811; G06F 12/0808; G06F 9/5061; G06F 2212/282; G06F 11/1072; G06F 12/0848; G06F 9/44563

USPC ......................................... 711/122
See application file for complete search history.

(56) References Cited

U.S. PATENT DOCUMENTS

| | | | | |
|---|---|---|---|---|
| 5,717,893 A | * | 2/1998 | Mattson | G06F 12/084 711/129 |
| 6,226,722 B1 | * | 5/2001 | Shippy | G06F 12/0884 711/168 |
| 7,805,706 B1 | * | 9/2010 | Ly | G06F 9/5083 709/221 |
| 8,001,338 B2 | * | 8/2011 | Moscibroda | G06F 13/1642 711/104 |
| 8,244,982 B2 | * | 8/2012 | Wolfe | G06F 12/084 711/128 |

(Continued)

FOREIGN PATENT DOCUMENTS

| | | |
|---|---|---|
| JP | 2001-209578 | 8/2001 |
| JP | 2002-229848 | 8/2002 |
| KR | 10-1232561 | 2/2013 |

OTHER PUBLICATIONS

English Abstract for Publication No. 10-2012-0090298.

*Primary Examiner* — Prasith Thammavong
*Assistant Examiner* — Alex Olson
(74) *Attorney, Agent, or Firm* — F. Chau & Associates, LLC (57) ABSTRACT

A multi-core CPU system includes a shared L2 cache, an access control logic circuit, a plurality of cores, each core configured to access the shared L2 cache through the access control logic circuit, and a size adjusting circuit configured to adjust a size of the shared L2 cache in response to an indication signal that indicates a number of operation cores among the plurality of cores.

14 Claims, 6 Drawing Sheets

(56) References Cited

U.S. PATENT DOCUMENTS

| | | | |
|---|---|---|---|
| 2002/0010836 A1* | 1/2002 | Barroso | G06F 12/0811 711/122 |
| 2003/0172234 A1* | 9/2003 | Soltis, Jr. | G06F 12/0848 711/122 |
| 2004/0205296 A1* | 10/2004 | Bearden | G06F 12/0866 711/129 |
| 2006/0171244 A1* | 8/2006 | Ando | G06F 12/0897 365/52 |
| 2006/0248287 A1* | 11/2006 | Buyuktosunoglu | G06F 12/0833 711/146 |
| 2008/0028252 A1* | 1/2008 | Vera | G06F 1/12 713/503 |
| 2010/0306477 A1* | 12/2010 | Luttrell | G06F 9/383 711/137 |
| 2011/0113215 A1* | 5/2011 | Thomas | G06F 12/0808 711/173 |
| 2012/0159074 A1* | 6/2012 | Sodhi | G06F 12/0895 711/122 |
| 2012/0173907 A1* | 7/2012 | Moses | G06F 1/3225 713/321 |
| 2013/0111121 A1* | 5/2013 | Ananthakrishnan | G06F 12/084 711/105 |
| 2013/0138890 A1* | 5/2013 | Tsao | G06F 13/1652 711/129 |
| 2015/0026406 A1* | 1/2015 | McLellan | G06F 12/0864 711/128 |
| 2015/0026407 A1* | 1/2015 | McLellan | G06F 12/0864 711/128 |
| 2015/0143044 A1* | 5/2015 | Gulati | G06F 12/084 711/121 |

* cited by examiner

MULTI-CORE CPU SYSTEM FOR ADJUSTING L2 CACHE CHARACTER, METHOD THEREOF, AND DEVICES HAVING THE SAME

CROSS-REFERENCE TO RELATED APPLICATION

This application claims under 35 U.S.C. §119(a) priority to and the benefit of Korean Patent Application No. 10-2013-0152783 filed on Dec. 10, 2013, the entire disclosure of which is incorporated by reference herein.

BACKGROUND

The present disclosure relates to a multi-core CPU system, and, more particularly, to a multi-core central processing unit (CPU) system which may adjust characteristics including a size and latency of a level 2 (L2) cache that may be accessed by operation cores according to a layout position of the operation cores and devices having the same.

A cache is a memory used to reduce average time taken for a CPU to access a main memory. The cache stores data frequently used and its associated address corresponding to a main memory.

The cache may be divided into a level 1 (L1) primary cache and a L2 secondary cache according to memory hierarchy thereof. As the size (or capacity) of the L2 cache increases, the latency of a core accessing the L2 cache also increases. In addition, the size of the L2 cache increases as the number of cores increases, so that the latency of each core accessing the L2 cache also increases. When the latency increases, performance of the multi-core CPU system including the cores is deteriorated.

SUMMARY

An exemplary embodiment of the present inventive concepts is directed to a multi-core CPU system which may adjust characteristics of a L2 cache (for example, a size and latency of the L2 cache), which can access operation cores according to a layout position of the operation cores, an operation method thereof, and devices including the same.

An exemplary embodiment of the present inventive concepts is directed to a multi-core central processing unit (CPU) system, including a shared level 2 (L2) cache, an access control logic circuit, a plurality of cores, each core configured to access the shared L2 cache through the access control logic circuit, and a size adjusting circuit configured to adjust a size of the shared L2 cache in response to an indication signal that indicates a number of operation cores among the plurality of cores.

According to an exemplary embodiment, when the shared L2 cache includes a plurality of L2 cache regions, the size adjusting circuit may control each power supplied to each of the plurality of L2 cache regions so as to adjust the size of the shared L2 cache. According to another exemplary embodiment, when the shared L2 cache includes a plurality of L2 cache regions, the size adjusting circuit may control connections among the plurality of L2 cache regions so as to adjust the size of the shared L2 cache.

According to still another exemplary embodiment, the size adjusting circuit may adjust the size of the shared L2 cache based on distances between the shared L2 cache and each of the plurality of cores. According to still another exemplary embodiment, when the shared L2 cache includes a plurality of L2 cache regions, the size adjusting circuit allocates at least one region among the plurality of L2 cache regions to the operation cores based upon latency between each of the plurality of L2 cache regions and the operation cores.

The size adjusting circuit may allocate all regions of the shared L2 cache so as to be accessed by all of the plurality of cores when all of the plurality of cores operate, and may allocate only some regions of the L2 cache so as to be accessed only by some of the plurality of cores when only the some cores among the plurality of cores operate.

A first latency between the shared L2 cache and the access control logic circuit when all of the plurality of cores operate may be larger than a second latency between the shared L2 cache and the access control logic circuit when only the some of the plurality of cores operate.

An exemplary embodiment of the present inventive concepts is directed to a system on chip (SoC), including the multi-core CPU processor, and a memory controller which controls data transmitted or received between the shared L2 cache and an external memory according to a control of the multi-core CPU processor.

When the shared L2 cache includes a plurality of L2 cache regions, the size adjusting circuit may control respective power supplied to each of the plurality of L2 cache regions, controls clock supplied to each of the plurality of L2 cache regions, or controls connections between the L2 cache regions so as to adjust the size of the shared L2 cache.

An exemplary embodiment of the present inventive concepts is directed to a computing system, including a multi-core central processing unit (CPU) system, a memory, and a memory controller configured to control data transmitted or received between a shared level 2 (L2) cache of the multi-core CPU system and the memory according to a control of the multi-core CPU system. The multi-core CPU system includes an access control logic circuit, a plurality of cores, each core configured to access the shared L2 cache through the access control logic circuit, and a size adjusting circuit configured to adjust the size of the shared L2 cache in response to an indication signal indicating the number of operation cores among the plurality of cores.

An exemplary embodiment of the present inventive concepts is directed to a method of operating a multi-core CPU system having a shared L2 cache and a plurality of cores each sharing the shared L2 cache, including accessing, by each of the plurality of cores, all regions of the shared L2 cache when all of the plurality of cores operate, and accessing, by each of the some cores, only some regions of the L2 cache when only some cores of the plurality of cores operate. Some regions of the L2 cache may be determined according to a layout position of each of the some cores.

DETAILED DESCRIPTION OF THE EMBODIMENTS

The present inventive concepts will now be described more fully hereinafter with reference to the accompanying drawings, in which exemplary embodiments of the invention are shown. This invention may, however, be embodied in many different forms and should not be construed as limited to the embodiments set forth herein. Rather, these embodiments are provided so that this disclosure will be thorough and complete, and will fully convey the scope of the invention to those skilled in the art. In the drawings, the size and relative sizes of layers and regions may be exaggerated for clarity. Like numbers refer to like elements throughout.

It will be understood that when an element is referred to as being "connected" or "coupled" to another element, it can be directly connected or coupled to the other element or intervening elements may be present. In contrast, when an element is referred to as being "directly connected" or "directly coupled" to another element, there are no intervening elements present. As used herein, the term "and/or" includes any and all combinations of one or more of the associated listed items and may be abbreviated as "/".

It will be understood that, although the terms first, second, etc. may be used herein to describe various elements, these elements should not be limited by these terms. These terms are only used to distinguish one element from another. For example, a first signal could be termed a second signal, and, similarly, a second signal could be termed a first signal without departing from the teachings of the disclosure.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," or "includes" and/or "including" when used in this specification, specify the presence of stated features, regions, integers, steps, operations, elements, and/or components, but do not preclude the presence or addition of one or more other features, regions, integers, steps, operations, elements, components, and/or groups thereof Unless otherwise defined, all terms (including technical and scientific terms) used herein have the same meaning as commonly understood by one of ordinary skill in the art to which this invention belongs. It will be further understood that terms, such as those defined in commonly used dictionaries, should be interpreted as having a meaning that is consistent with their meaning in the context of the relevant art and/or the present application, and will not be interpreted in an idealized or overly formal sense unless expressly so defined herein.

Figure 1:
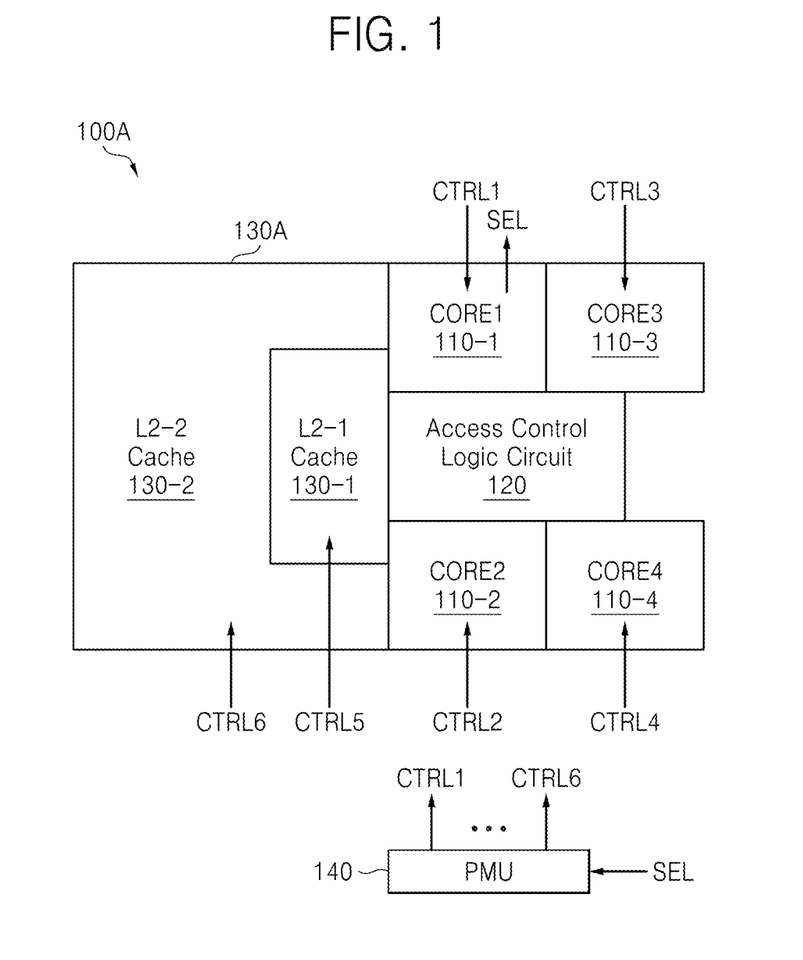
FIG. 1 is a schematic block diagram of a multi-core CPU system according to an exemplary embodiment of the present inventive concepts.

FIG. 1 is a schematic block diagram of a multi-core CPU system according to an exemplary embodiment of the present inventive concepts. Referring to FIG. 1, a multi-core CPU system 100A includes a plurality of cores 110-1, 110-2, 110-3, 110-4, an access control logic circuit 120, and a shared level 2 (L2) cache 130A. According to some exemplary embodiments, the multi-core CPU system 100A may further include a power management unit (PMU) 140 which can perform the function of adjusting the size (or capacity) of the shared L2 cache 130A.

For convenience of description in FIG. 1, four cores 110-1 to 110-4 and a shared L2 cache 130A which includes two L2 cache regions 130-1, 130-2 are illustrated. However, the technical aspects of the present inventive concepts, i.e., a technology of adjusting the size and/or the latency of the shared L2 cache 130A according to the number of operation cores, is not limited to the number of cores and the number of L2 cache regions of the shared L2 cache embodied in the multi-core CPU system.

Each of the plurality of cores 110-1 to 110-4 may access the shared L2 cache 130A through the access control logic circuit 120. According to an exemplary embodiment, each of the plurality of cores 110-1 to 110-4 may be embodied in a different power domain. The performance and the size of each of the plurality of cores 110-1 to 110-4 may be vary according to a design specification.

The PMU 140 may perform the function of a size adjusting circuit which adjusts the size of the shared L2 cache 130A in response to an indication signal SEL that indicates the number of cores operating (hereinafter, referred to as "operation cores") among the cores 110-1 to 110-4.

According to an exemplary embodiment, a first core 110-1 may transmit an indication signal SEL to the PMU 140 in response to a control signal related to a control of the indication signal SEL. According to another exemplary embodiment, the indication signal SEL may be output from another control circuit (not shown).

The PMU 140 may control the respective power supplied to each core 110-1 to 110-4 and the respective power supplied to each L2 cache region 130-1 and 130-2 in response to the indication signal SEL. For example, the PMU 140 may output each control signal CTRL1, CTRL2, CTRL3, CTRL4, CTRL5, CTRL6 to its respective element (or component) 110-1 to 110-4, 130-1, and 130-2 in response to the indication signal SEL.

According to an exemplary embodiment, each element 110-1 to 110-4, 130-1, 130-2 may supply or block corresponding power to or from each element 110-1 to 110-4, 130-1, 130-2 in response to its control signal CTRL1 to CTRL6. According to another exemplary embodiment, each control signal CTRL1 to CTRL6 may mean power itself supplied to each element 110-1 to 110-4, 130-1, 130-2.

According to still another exemplary embodiment, each control signal CTRL1 to CTRL6 may mean a clock supplied to each element 110-1 to 110-4, 130-1, 130-2. Here, the multi-core CPU system 100A may further include a clock management unit for generating each control signal CTRL1 to CTRL6 in response to an indication signal SEL. The clock management unit may be included in the size adjusting circuit. Accordingly, as each power or each clock supplied to each L2 cache region 130-1, 130-2 is turned on or off, the size of the shared L2 cache 130A may be adjusted.

Figure 2A:
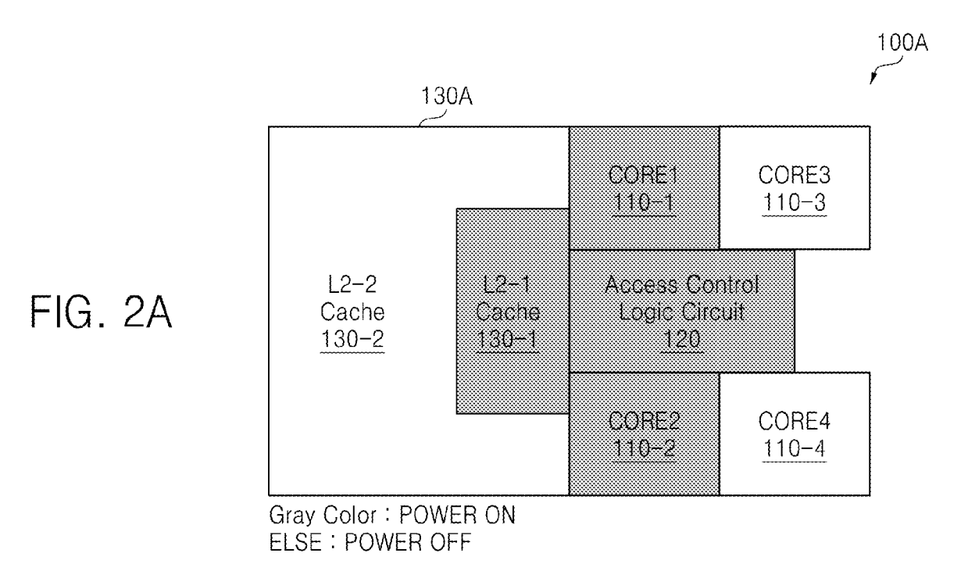
FIGS. 2A and 2B are exemplary embodiments of a conceptual diagram describing a relationship between the number of operation cores and the size of a L2 cache of the multi-core CPU system illustrated in FIG. 1.
Figure 2B:
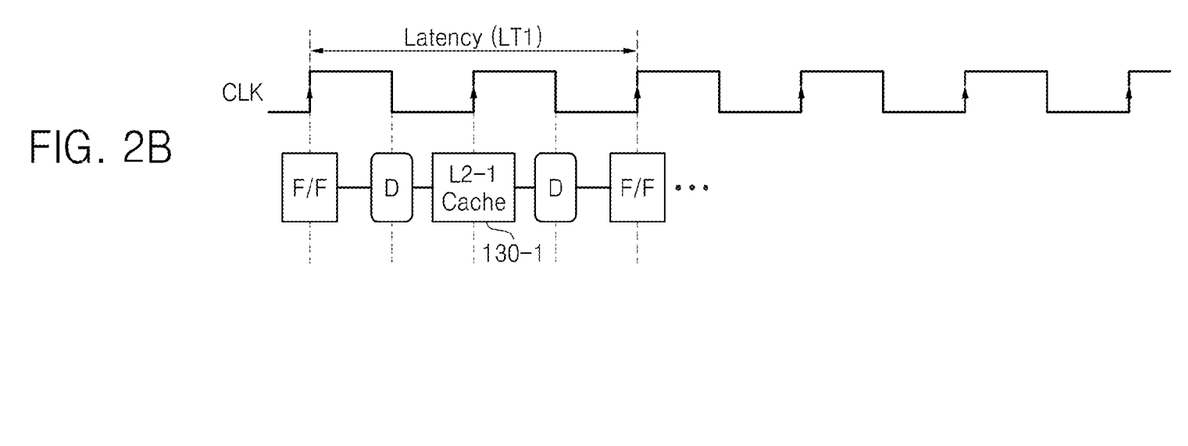

FIGS. 2A and 2B are exemplary embodiments of a conceptual diagram describing a relationship between the number of operation cores and the size of a L2 cache of the multi-core CPU system illustrated in FIG. 1. When only two cores 110-1, 110-2 among four cores 110-1 to 110-4 operate, an operation of the multi-core CPU system 110A will be described referring to FIGS. 1, 2A, and 2B.

As illustrated in FIG. 2A, power is supplied to each of the two cores 110-1, 110-2, and power is not supplied to each of two cores 110-3, 110-4 according to a control of the PMU 140. In addition, power is supplied to a first L2 cache region 130-1 (hereinafter, referred to as "L2-1 cache") while power is not supplied to a second L2 cache region 130-2 (hereinafter, referred to as "L2-2 cache") according to a control of the PMU 140.

When viewed from a viewpoint of each of the cores 110-1, 110-2 and the access control logic circuit 120, the L2-1 cache 130-1 and the access control logic circuit 120 are positioned close to each other, and thereby latency is will be small.

As illustrated in FIG. 2B, "D" represents a routing delay and a logic delay, and "F/F" represents a latch which processes data so as to perform a write operation or a read operation according to a clock CLK. It is assumed that latency LT1 between each of the cores 110-1 and 110-2 and the L2-1 cache 130-1 is two (2) clock cycles. That is, since the L2-1 cache 130-1 and the L2-2 cache 130-2 are physically separated from each other according to the supplied power or clock, an entire RC delay of the shared L2 cache 130A may be reduced.

Figure 3A:
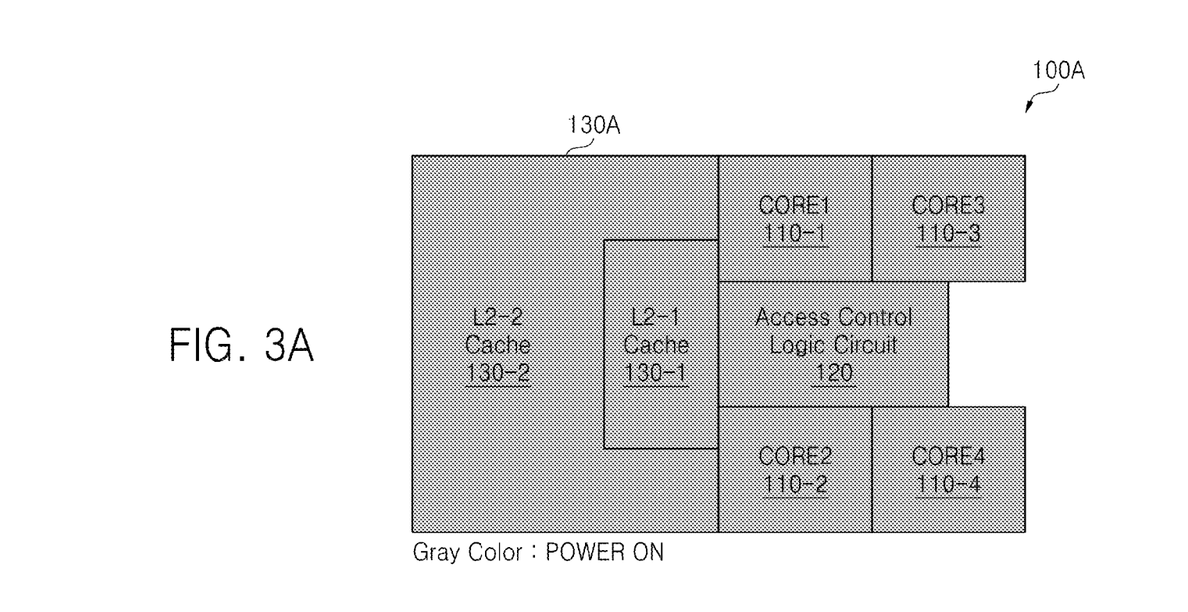
FIGS. 3A and 3B are other exemplary embodiments of the conceptual diagram describing the relationship between the number of operation cores and the size of the L2 cache of the multi-core CPU system illustrated in FIG. 1.
Figure 3B:
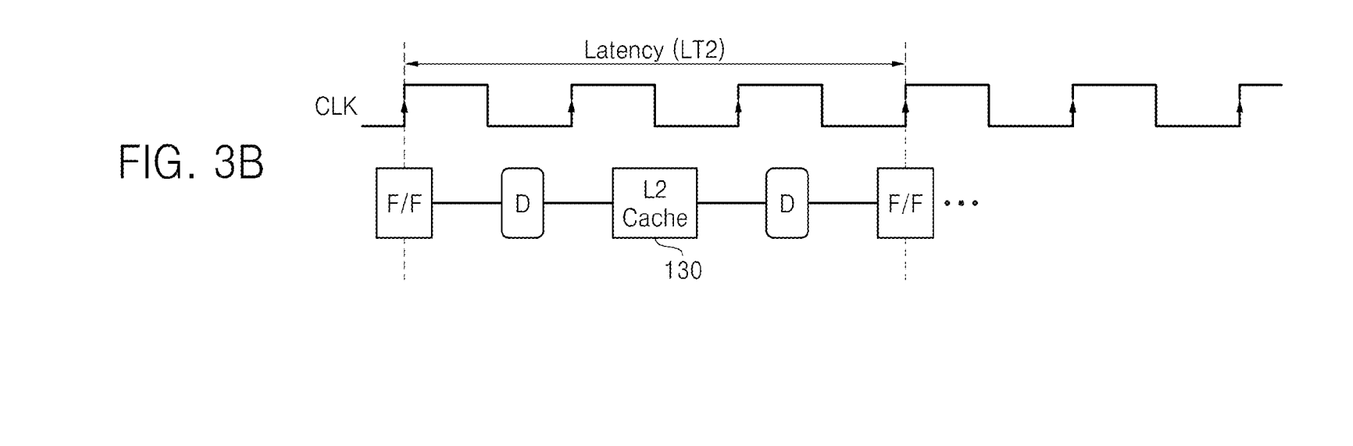

FIGS. 3A and 3B are other exemplary embodiments of the conceptual diagram describing the relationship between the number of operation cores and the size of the L2 cache of the multi-core CPU system illustrated in FIG. 1.

When all of the four cotes 110-1 to 110-4 operate, an operation of the multi-core CPU system 110A may be described referring to FIGS. 1, 3A and 3B. As illustrated in FIG. 3A, corresponding power is supplied to each of the four cores 110-1 to 110-4 according to a control of the PMU 140. Moreover, corresponding power is supplied to the L2-1 cache 130-1 and the L2-2 cache 130-2 according to a control of the PMU 140.

As illustrated in FIG. 3B, "D" also represents a routing delay and a logic delay, and "F/F" also represents a latch which processes data so as to perform a write operation or a read operation according to a clock CLK. It is assumed that latency LT2 between each of the cores 110-1 to 110-4 and the shared L2 cache 130A is three (3) clock cycles. That is, as the L2-1 cache 130-1 and the L2-2 cache 130-2 are physically connected to each other according to the supplied power, an entire RC delay of the shared L2 cache 130 may be increased.

Each of the latencies LT1, LT2 is only a selected representation for conceptually describing how latency is changed according to the size of the shared L2 cache 130A.

Figure 4:
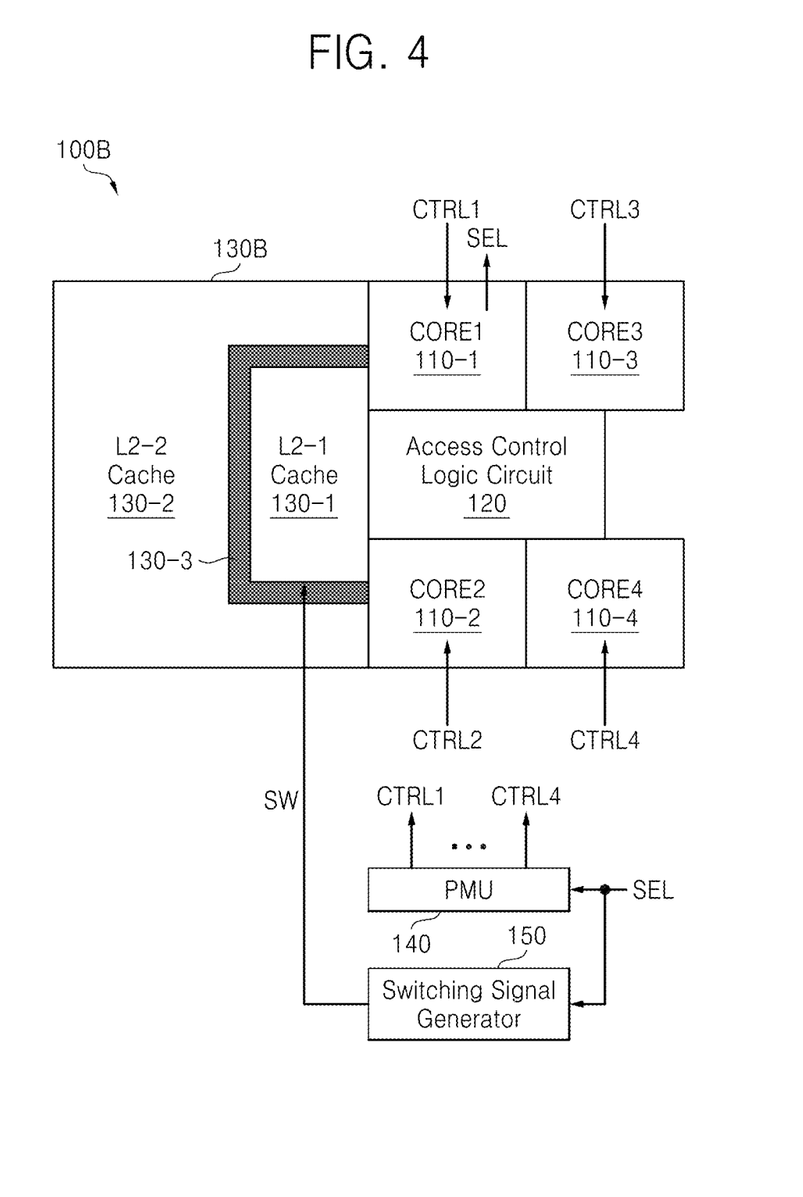
FIG. 4 is a schematic block diagram of a multi-core CPU system according to another exemplary embodiment of the present inventive concepts.

FIG. 4 is a schematic block diagram of a multi-core CPU system according to another exemplary embodiment of the present inventive concepts. Referring to FIG. 4, a multi-core CPU system 100B includes the plurality of cores 110-1 to 110-4, the access control logic circuit 120, and a shared L2 cache 130B.

According to another exemplary embodiment, the multi-core CPU system 100B may further include a size adjusting circuit which may adjust the size of the shared L2 cache 130B.

The size adjusting circuit may include the PMU 140 and a switch signal generator 150. The multi-core CPU system 100B may further include a clock management unit controlling a supply of a clock. In this case, the clock management unit may be included in the size adjusting circuit.

Each of the plurality of cores 110-1 to 110-4 may access the shared L2 cache 130B through the access control logic circuit 120.

The PMU 140 may control respective power supplied to each of the cores 110-1 to 110-4 in response to an indication signal SEL indicating the number of operation cores among the cores 110-1 to 110-4. For example, the PMU 140 may output each control signal CTRL1 to CTRL4 to respective cores 110-1 to 110-4 in response to the indication signal SEL. Here, the PMU 140 may control power supplied to the shared L2 cache 130B.

According to an exemplary embodiment, each of the cores 110-1 to 110-4 may supply or block power to or from each of the cores 110-1 to 110-4 in response to respective control signals CTRL1 to CTRL4. According to another exemplary embodiment, each control signal CTRL1 to CTRL4 may represent power itself supplied to each of the cores 110-1 to 110-4. Here, an indication signal SEL may be supplied to the clock management unit.

The switching signal generator 150 may transmit a switching signal SW which may control connection between the L2-1 cache 130-1 and the L2-2 cache 130-2 to a switching block 130-3 of the shared L2 cache 130B in response to the indication signal SEL.

The switching block 130-3 included in the shared L2 cache 130B may control connection between the L2-1 cache 130-1 and the L2-2 cache 130-2. The switching block 130-3 may include switches.

Referring to FIGS. 2A, 2B, and 4, corresponding power is supplied to each of the two cores 110-1 and 110-2, while corresponding power is not supplied to each of the two cores 110-3 and 110-4 according to a control of the PMU 140. Here, the switching block 130-3 separates the L2-1 cache 130-1 and the L2-2 cache 130-2 from each other in response to a switching signal SW.

Each of the two cores 110-1, 110-2 may access the L2-1 cache 130-1 through the access control logic circuit 120.

Referring to FIGS. 3A, 3B, and 4, corresponding power is supplied to each of the four cores 110-1 to 110-4 according to a control of the PMU 140, and the switching block 130-3 connects the L2-1 cache 130-1 and the L2-2 cache 130-2 to each other in response to the switching signal SW. Each of the four cores 110-1 to 110-4 may access the L2-1 cache 130-1 and/or the L2-2 cache 130-2 through the access control logic circuit 120.

Figure 5:
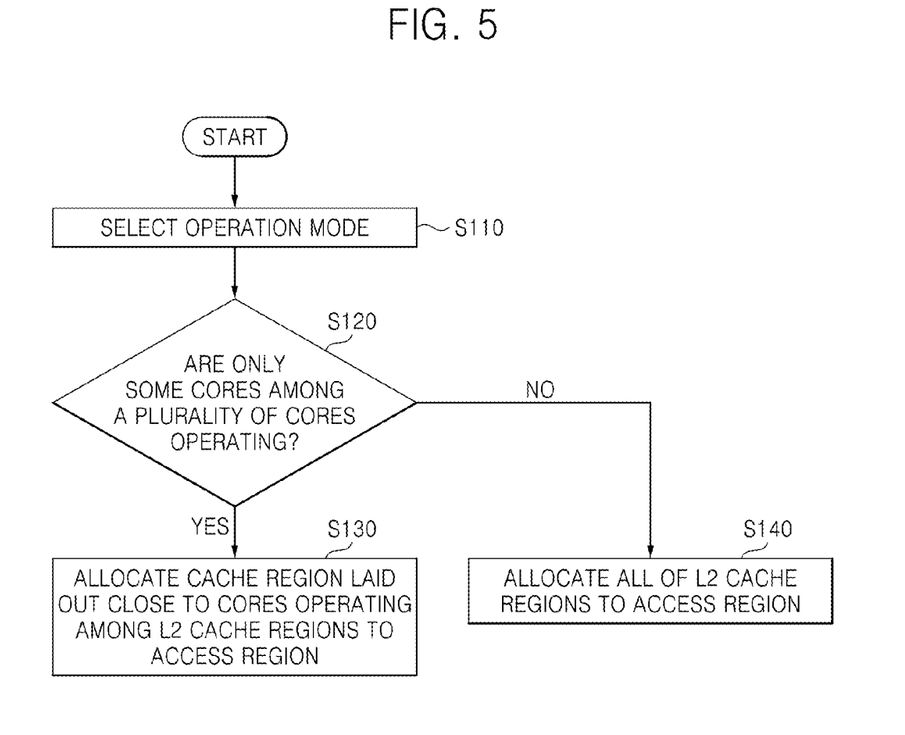
FIG. 5 is a flowchart for describing an operation of the multi-core CPU system illustrated in FIG. 1 or 4.

FIG. 5 is a flowchart for describing the operation of the multi-core CPU system illustrated in FIG. 1 or 4. Referring to FIG. 5, an operation mode may be selected (S110) by a user or the first core 110-1. The operation mode may be defined as a mode which selects how many core(s) to operate among a plurality of cores 110-1 to 110-4. The indication signal SEL corresponding to the operation mode is generated.

The PMU 140 determines (S120) whether only some cores 110-1 and 110-2 operate among the plurality of cores 110-1 to 110-4 in response to the indication signal SEL.

When only some cores 110-1, 110-2 operate, the PMU 140 of FIG. 1 which may function as the size adjusting circuit (or the elements 140, 150 of FIG. 4 which may function as the size adjusting circuit) may allocate (S130) a cache region 130-1, which is laid out close to operation cores 110-1, 110-2 among a plurality of L2 cache regions 130-1, 130-2 included in the shared L2 cache 130A, to an access region which may be accessed by each of the some cores 110-1, 110-2.

However, when all of the plurality of cores 110-1 to 110-4 operate, the PMU 140 of FIG. 1 which may function as the size adjusting circuit (or the element 140 and 150 of FIG. 4 which may function as the size adjusting circuit) may allocate (S140) all of the plurality of L2 cache regions 130-1, 130-2 included in the shared L2 cache 130A to an access region which may be accessed by each of the plurality of cores 110-1 to 110-4.

Figure 6:
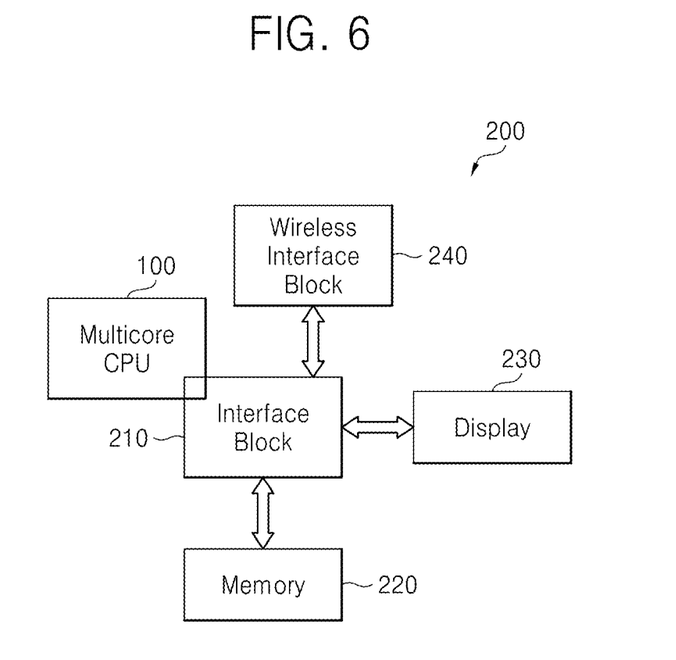
FIG. 6 is a schematic block diagram of a computing system including the multi-core CPU system illustrated in FIG. 1 or 4.

FIG. 6 is a schematic block diagram of an exemplary computing system including the multi-core CPU system illustrated in FIG. 1 or 4. Referring to FIGS. 1 to 6, a computing system 200 includes a multi-core CPU system 100A or 100B (collectively, "100"), an interface block 210, an external memory 220, a display 230, a wireless (radio) interface block 240.

The computing system 200 may be a PC, a data server, a portable electronic device, or the like. The portable electronic device may be a laptop computer, a smart phone, a tablet PC, a mobile internet device (MID), an internet tablet, a wearable computer, or the like.

The multi-core CPU system 100 may transmit or receive data to or from the external memory 220, the display 230, and the wireless interface block 240 through the interface block 210. The interface block 210 may include a memory controller which may control the external memory 220, and a display controller which may control the display 230.

The external memory 220 may be embodied in a volatile memory such as dynamic random access memory (DRAM), or a non-volatile memory, such as a flash memory. The wireless interface block 240 may transmit or receive data to or from an external computing device through a radio communication network.

An integrated circuit (IC), a system on chip (SoC), an application processor, or a mobile application processor may include the multi-core CPU system 100 and the interface block 210.

In accordance with the present inventive concepts, the control of a power supply, the control of a clock supply, and the switching operation are illustrated by an exemplary embodiment in which the size of the shared L2 cache 130A or 130B is adjusted according to the number of operation cores. However, the method of adjusting the size of the shared L2 cache 130A or 130B may vary. In addition, as the size of the shared L2 cache 130A or 130B decreases, a routing delay is decreased and bit-line loading of a memory cell included in the shared L2 cache 130A or 130B is decreased, thereby decreasing latency.

A multi-core CPU system according to an exemplary embodiment of the present inventive concepts may adjust characteristics of the L2 cache (e.g., the size and/or the latency of the L2 cache) that may be accessed by operation cores according to a layout position of the operation cores.

In addition, when only some cores among all cores operate, the multi-core CPU system according to an exemplary embodiment of the present inventive concepts may allocate only a specific region of a L2 cache to an access region which may be accessed by the operating cores considering latency. Accordingly, the multi-core CPU system may improve the entire performance of the multi-core CPU system by decreasing latency of the multi-core CPU system. Moreover, the multi-core CPU system according to an exemplary embodiment of the present inventive concepts may reduce the number of pipelines necessary for data processing when only some cores among the all cores operate.

Although a few embodiments of the present general inventive concepts have been shown and described, it will be appreciated by those skilled in the art that changes may be made to these embodiments without departing from the principles and spirit of the general inventive concept, the scope of which is defined in the appended claims and their equivalents.

What is claimed is:

1. A multi-core central processing unit (CPU) system comprising:
    a shared level 2 (L2) cache;
    an access control logic circuit;
    a plurality of cores, each core configured to access the shared L2 cache through the access control logic circuit; and
    a size adjusting circuit configured to adjust a size of the shared L2 cache in response to an indication signal that indicates a number of operation cores among the plurality of cores transmitted from one core among the plurality of cores,
    wherein the shared L2 cache includes a plurality of L2 cache regions, and
    wherein the size adjusting circuit is configured to allocate at least one region among the plurality of L2 cache regions to the operation cores based upon distance from the operation cores.

2. The multi-core CPU system of claim 1,
    wherein the size adjusting circuit is configured to control respective power supplied to each of the plurality of L2 cache regions so as to adjust the size of the shared L2 cache.

3. The multi-core CPU system of claim 1,
    wherein the size adjusting circuit is configured to control connections among the plurality of L2 cache regions so as to adjust the size of the shared L2 cache.

4. The multi-core CPU system of claim 1,
    wherein the size adjusting circuit is configured to allocate all regions of the shared L2 cache so as to be accessed by all of the plurality of cores when all of the plurality of cores operate, and
    wherein the size adjusting circuit is configured to allocate only some regions of the L2 cache so as to be accessed only by some of the plurality of cores when only the some of the plurality of cores operate.

5. The multi-core CPU system of claim 4, wherein a first latency between the shared L2 cache and the access control logic circuit when all of the plurality of cores operate is larger than a second latency between the shared L2 cache and the access control logic circuit when only the some of the plurality of cores operate.

6. A system on chip (SoC) comprising:
    a multi-core central processing unit (CPU) system; and
    a memory controller configured to control data transmitted or received between a shared level 2 (L2) cache of the multi-core CPU system and an external memory according to a control of the multi-core CPU system,
    wherein the multi-core CPU system includes:
        an access control logic circuit;
        a plurality of cores, each core configured to access the shared L2 cache through the access control logic circuit; and
        a size adjusting circuit configured to adjust a size of the shared L2 cache in response to an indication signal that indicates a number of operation cores among the plurality of cores transmitted from one core among the plurality of cores,
    wherein the shared L2 cache includes a plurality of L2 cache regions, and
    wherein the size adjusting circuit is configured to allocate at least one region among the plurality of L2 cache regions to the operation cores based upon distance from the operation cores.

7. The SoC of claim 6,
wherein the size adjusting circuit is configured to control respective power supplied to each of the plurality of L2 cache regions so as to adjust the size of the shared L2 cache.

8. The SoC of claim 6,
wherein the size adjusting circuit is configured to control connections among the plurality of L2 cache regions so as to adjust the size of the shared L2 cache.

9. The SoC of claim 6,
wherein the size adjusting circuit is configured to allocate all regions of the shared L2 cache so as to be accessed by all of the plurality of cores when all of the plurality of cores operate, and
wherein the size adjusting circuit is configured to allocate only some regions of the L2 cache so as to be accessed only by some of the plurality of cores when only the some of the plurality of cores operate.

10. The SoC of claim 9, wherein a first latency between the shared L2 cache and the access control logic circuit when all of the plurality of cores operate is larger than a second latency between the shared L2 cache and the access control logic circuit when only the some of the plurality of cores operate.

11. A computing system comprising:
a multi-core central processing unit (CPU) system;
a memory; and
a memory controller configured to control data transmitted or received between a shared level 2 (L2) cache of the multi-core CPU system and the memory according to a control of the multi-core CPU system,
wherein the multi-core CPU system includes:
   an access control logic circuit;
   a plurality of cores, each core configured to access the shared L2 cache through the access control logic circuit; and
   a size adjusting circuit configured to adjust a size of the shared L2 cache in response to an indication signal that indicates a number of operation cores among the plurality of cores transmitted from one core among the plurality of cores,
wherein the shared L2 cache includes a plurality of L2 cache regions, and
wherein the size adjusting circuit is configured to allocate at least one region among the plurality of L2 cache regions to the operation cores based upon distance from the operation cores.

12. The computing system of claim 11,
wherein the size adjusting circuit is configured to control respective power supplied to each of the plurality of L2 cache regions so as to adjust the size of the shared L2 cache.

13. The computing system of claim 11,
wherein the size adjusting circuit is configured to control connections among the plurality of L2 cache regions so as to adjust the size of the shared L2 cache.

14. The computing system of claim 11,
wherein the size adjusting circuit is configured to allocate all regions of the shared L2 cache so as to be accessed by all of the plurality of cores when all of the plurality of cores operate, and
wherein the size adjusting circuit is configured to allocate only some regions of the L2 cache so as to be accessed only by some of the plurality of cores when only the some of the plurality of cores operate.

* * * * *